Patented July 5, 1932

1,866,414

UNITED STATES PATENT OFFICE

EUGENE J. LORAND, OF STATE COLLEGE, PENNSYLVANIA, ASSIGNOR TO THE PENNSYLVANIA STATE COLLEGE, OF STATE COLLEGE, PENNSYLVANIA, A CORPORATION OF PENNSYLVANIA

PROCESS FOR MAKING A CONCENTRATED COFFEE PRODUCT

No Drawing.  Application filed June 13, 1928. Serial No. 285,199.

This invention is a process for making a concentrated coffee extract.

Attempts have been made in the past to prepare a concentrated coffee extract, by making an infusion of coffee with water, and removing some or all of the water to give a thick or powdered product, to which water could be added for producing a beverage. Due, however, to the high volatility of the gases, an aromatic and essential oils that give coffee its distinctive flavor, the results have not been satisfactory in producing an extract which, when water is added, accurately reproduce the true coffee flavor. The group of substances, usually high volatile, which give coffee its distinctive flavor may be designated "caffeol".

It has also been proposed to collect the highly volatile gases, such as caffeol, which pass off during evaporation, in a solvent, and return them to the concentrated extract.

These processes, however, involve evaporation of the infusion or evaporation of the solvent and present the serious objection that when any evaporation step is used, the highly volatile essential oils that give coffee its flavor are lost. It is a very important point in this invention that no evaporation step is used.

According to this invention, the coffee is treated directly with a liquid which catches and retains the aromatic and volatile oils and flavors of the coffee, and which dissolves the caffeine of the coffee. The liquid used is edible and remains in and forms a part of the coffee extract. Glycerine or its chemical equivalent is the liquid used.

According to this invention, the ground and roasted coffee beans are treated directly with anhydrous glycerine, at a suitable temperature, whereby the coffee flavors are taken up and satisfactorily retained in the glycerine. The caffeol is taken up and retained by the glycerine. Likewise the caffeine, which is readily soluble in glycerine, is extracted by the glycerine.

It has been found that the presence of water is a disadvantage, in that it seems to extract bitter constituents from the coffee or seems to cause the formation of bitter constituents, probably acids, which give an unpleasant flavor to the resulting product. This is avoided by the use of anhydrous glycerine.

Furthermore, in ground, roasted coffee, the caffeol is apparently present in a combined state, probably as a glucoside, in which state it is not volatile. The presence of even a small amount of water tends to hydrolyze this "mother substance", which is sometimes termed caffeogen, into caffeol and a carbohydrate; this decomposition is distinctly to be avoided, because the caffeol is highly volatile and fugitive. By operating under anhydrous conditions, the hydrolysis of the caffeogen, with resultant formation and escape of caffeol, is avoided.

The present preferred way of carrying out the process is as follows: Freshly ground and preferably freshly roasted coffee is heated with about four times of its weight of commercial glycerine; the drier the glycerine the better. The coffee should not be pulverized, as this increases the difficulty of subsequent filtration. The temperature of the heating should not exceed 100° C. and the optimum range is from 80–90° C. This heating is continued from 3–8 hours; for fresh grounds, this heating is from 5–6 hours; for already treated grounds, (if the counter current process is used, as will be described), this heating is from 2–5 hours.

This heating is done under reduced pressure, preferably under a vacuum of about 27 inches of mercury. Such a heating under such a pressure removes the water, the removal of which is of importance, in order to avoid bitter products in the resulting extract.

The above described heating is preferably done in cast iron, glass lined vacuum kettles, or other non-metallic containers. The contents of the kettle or container are stirred continuously by a power operated stirring device of any suitable type.

The resulting mixture of coffee grains and the glycerine extract is now purified by filtration. This filtration presents some difficulties, because the coffee particles tend to clog the filter, necessitating frequent cleaning; even with ordinary grinding of the coffee beans, some very fine dust is inevitably formed, which is difficult to filter out. The complete removal of all particles of coffee is necessary, in order to give an extract which is of good flavor and appearance or "gleam." Also, if such particles are not removed, there is a "rough" taste to the extract.

The filtration is preferably done in two stages: In the first stage, the solution is filtered by gravity through a 60 mesh screen, which removes about half of the coffee grounds. In the second stage for the removal of the fine particles, the solution is filtered through a pressure filter, such as a Sweetland filter, under a pressure of about 10–50 pounds per square inch. Other pressures could be used. If the filter has metal parts, they should be covered by porcelain or the like. In order to aid this filtration, a small amount, about 1% of "hyflo super cel", a commercial product which is a highly refined diatomaceous earth, is preferably added. The filtrate is clear, of good flavor and good "gleam". The Sharpless supercentrifuge can be used for this second stage filtration, for the removal of the very fine particles, although this is not as satisfactory as the Sweetland pressure filter.

On account of the viscosity of cold glycerine, the filtration is done at about 70° C.–90° C.

For the strongest extract, a single lot of glycerine is applied to successive batches of fresh coffee. The product is strong, but is relatively wasteful of glycerine and coffee. A strong extract may also be made by allowing fresh glycerine to act on grounds that have been extracted once, and then applying this glycerine solution to successive batches of fresh coffee. This, however, is not as economical of glycerine and coffee as the three-stage, counter current process which will now be described, and which is the preferred way of practicing the invention.

In the countercurrent process fresh glycerine is introduced into a kettle which contains grounds that have already been through two extractions. The resulting extract is then used to treat coffee grounds that have already had one extraction. This product in turn is used in the third stage with fresh coffee. The product resulting from this third stage is the finished concentrated coffee extract. The coffee itself travels in reverse direction and first meets an extract which has already been twice in contact with coffee grounds.

The grounds from this treatment are extracted with an extract that has been through the treatment, and finally are extracted with fresh glycerine. In such a counter-current process the strongest coffee solution is treated with the strongest, (i. e. the fresh) coffee, while the coffee grounds which are almost exhausted are treated with fresh glycerine, which obviously has the greatest solvent power for coffee and will extract flavoring matter from the grounds which an extract that already contains some coffee will not absorb. If, for example, three containers for the coffee are used, the fresh glycerine acts on the coffee grounds which have been twice extracted, and any given batch of coffee is extracted three times, first by a glycerine extract which has passed through two other batches of coffee, second by a glycerine extract which has passed through one batch of coffee and third by fresh glycerine. Four or five more stages may be used if desired.

The counter-current principle is preferably carried out by changing the flow of the glycerine, without actually changing the coffee grounds from one tank to another.

The concentrated extract thus prepared is readily soluble in hot water, and at a dilution of 1 to 20 with hot water gives a solution substantially identical with the ordinary coffee beverage. The extract may also be used as a flavor for ice cream, chewing gum, candy, cake and other food products.

The grounds which have been extracted as described still contain considerable glycerine adherent thereto and it is of importance to recover this glycerine from the grounds before they are discarded. This recovery is effected by washing the grounds with water and filtering; the solution is then evaporated at a low temperature, under a vacuum of about 26 inches of mercury, which removes the water. The glycerine extract remaining is mixed with fresh glycerine and used in further extraction.

The use of glycerine for extracting the coffee flavors is of particular advantage, because it is not a solvent for fats, and so it does not remove fats from the coffee beans. Since fats tend to become rancid, it is of importance to avoid the presence of fats in the resulting extract. The resulting extract therefore, contains no fats and is toxic to bacteria, hence the keeping qualities of the extract are good.

The term glycerine as used in the claims, is intended to cover the chemical equivalents of glycerine.

The process described may be used with satisfactory results in coffees which have been previously treated to remove the caffeine.

I claim as my invention:

1. The process of preparing a concentrated soluble coffee extract, comprising heating ground roasted coffee beans with about four times their weight of anhydrous glycerine, at about 80–90° C., and filtering at an elevated temperature.

2. The process of preparing a concentrated soluble coffee extract comprising heating ground, roasted coffee in the presence of anhydrous glycerine under a partial vacuum.

3. The process as claimed in the preceding claim, where the amount of anhydrous glycerine used is about four times the weight of the coffee.

In testimony whereof I hereunto affix my signature.

EUGENE J. LORAND.